Patented Dec. 9, 1930

1,784,398

UNITED STATES PATENT OFFICE

KARL THIESS, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

AZO DYESTUFFS

No Drawing. Application filed July 23, 1929, Serial No. 380,467, and in Germany August 13, 1928.

The present invention relates to azo dyestuffs.

I have found that yellow disazo dyestuffs are obtained by coupling the diazo compound of a 4.4'-diamino-triphenyl-methane derivative containing at least one halogen atom in each of the three benzene nuclei with a 1-halogen-sulfo-aryl-3-alkyl-5-pyrazolone or a substitution product thereof. The new dyestuffs thus obtained are distinguished by the pure shade they give and their good fastness properties, particularly by their fastness to fulling and light.

I have furthermore found that yellow disazo dyestuffs of the same good fastness properties are obtained by coupling a 1-halogensulfo-aryl-3-alkyl-5-pyrazolone or a substitution product thereof with the diazo compound of a 4.4'-diamino-triphenyl-methane which has in each of the amino-containing benzene nuclei a halogen atom and a methyl group in ortho-position to the amino groups and which has no halogen in the benzene nucleus free from an amino group.

The new dyestuffs obtainable according to the present invention correspond to the following general formula:

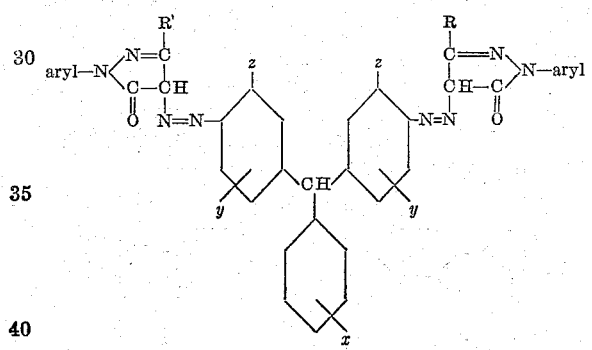

wherein
  $x$ stands for hydrogen or halogen,
  $y$ for halogen,
  $z$ for hydrogen or a methyl group and
  R for hydrogen or an alkyl group and
wherein each of the two aryl-residues contains halogen and a sulfo group, being greenish-yellow powders which dissolve in water to a yellow solution.

The starting materials may be obtained by condensing according to known methods halogen-benzaldehydes with halogen-anilines, halogen-toluidines or the like having a free 4-position to the amino group, or by condensing benzaldehyde with 3-halogen-2-toluidine. The components may be coupled in the usual manner in an alkaline solution.

The following examples serve to illustrate my invention but they are not intended to limit it thereto.

(1) A water-soluble dyestuff dyeing wool from an acid bath clear greenish-yellow tints is obtained by tetrazotizing a 4.4'-diaminotrichloro-triphenyl-methane derivative of the following constitution:

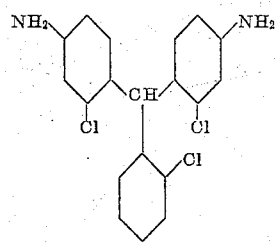

and coupling it with 1-(2'-chloro-5'-sulfo)-phenyl-3-methyl-5-pyrazolone. The dyeings are distinguished by their excellent fastness to fulling and light.

(2) A dyestuff dyeing a somewhat greener shade is obtained by coupling the same tetrazotized 4.4'-diamino-trichloro-triphenyl-methane derivative with 1-(2'.5'-dichloro-4'-sulfo)-phenyl-3-methyl-5-pyrazolone.

(3) By tetrazotizing a 4.4'-diamino-trichloro-triphenyl-methane derivative of the following formula:

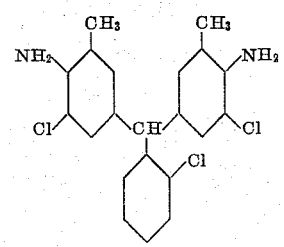

and coupling it with 1-(2'-chloro-5'-sulfo)- phenyl-3-methyl-5-pyrazolone a water-soluble dyestuff is obtained dyeing wool very vivid greenish-yellow tints of very good fastness properties.

(4) By tetrazotizing a 4.4'-diamino-dichloro-triphenyl-methane derivative of the following constitution:

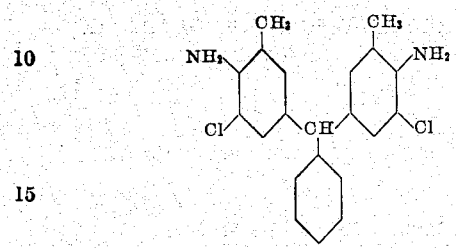

and coupling it with 1-(2'-chloro-5'-sulfo)-phenyl-3-methyl-5-pyrazolone a water-soluble dyestuff of very good fastness properties is obtained dyeing wool very vivid greenish-yellow tints. It has the following formula:

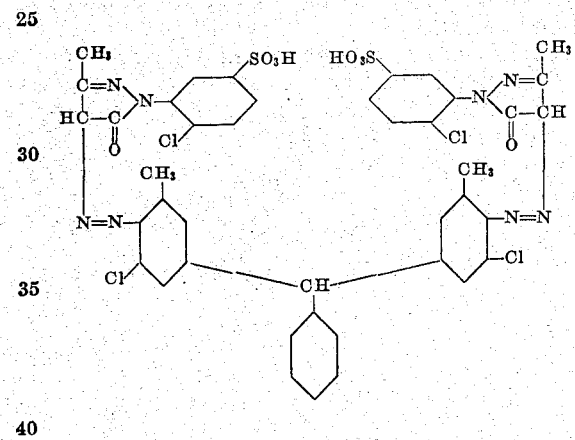

I claim:

1. As new products, the compounds of the following formula:

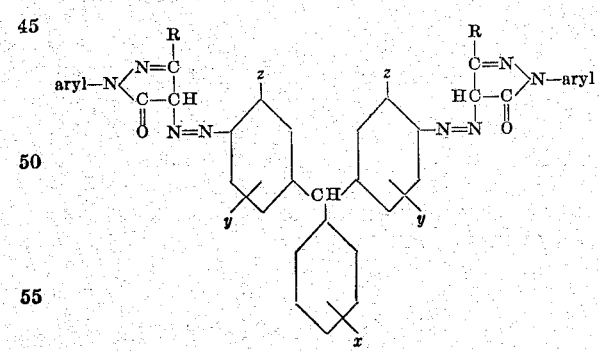

wherein $x$ stands for hydrogen or halogen, $y$ for halogen, $z$ for hydrogen or a methyl group and R for hydrogen or an alkyl group and wherein each of the two aryl-residues contains halogen and a sulfo group, being greenish-yellow powders which dissolve in water to a yellow solution.

2. As new products, compounds of the following formula:

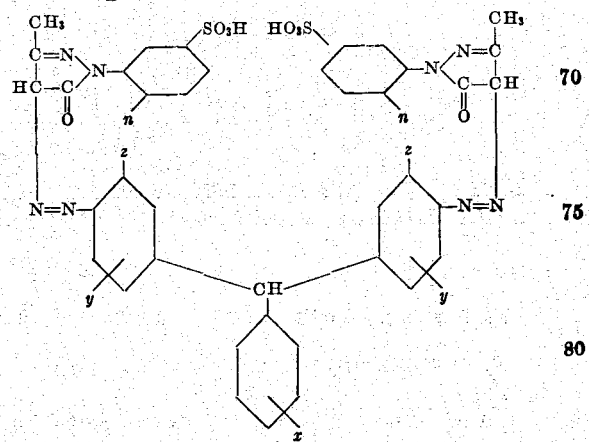

wherein $x$ stands for hydrogen or halogen, $y$ for halogen, $z$ for hydrogen or a methyl group and $n$ for halogen, being greenish-yellow powders which dissolve in water to a yellow solution.

3. As new products, the compounds of the following formula:

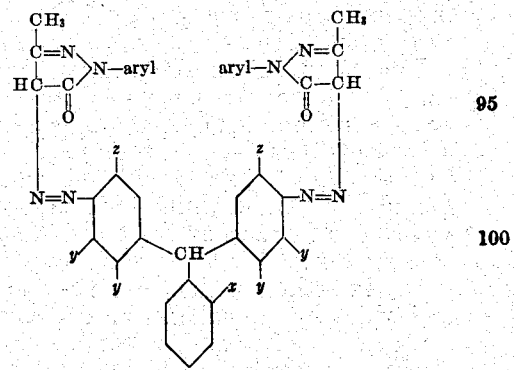

wherein $x$ stands for hydrogen or halogen, one $y$ in each nucleus for halogen, the other $y$ in each nucleus for hydrogen, $z$ for hydrogen or a methyl group and wherein each of the two aryl residues contains halogen and a sulfo group, being greenish-yellow powders which dissolve in water to a yellow solution.

4. As new product, the compounds of the following formula:

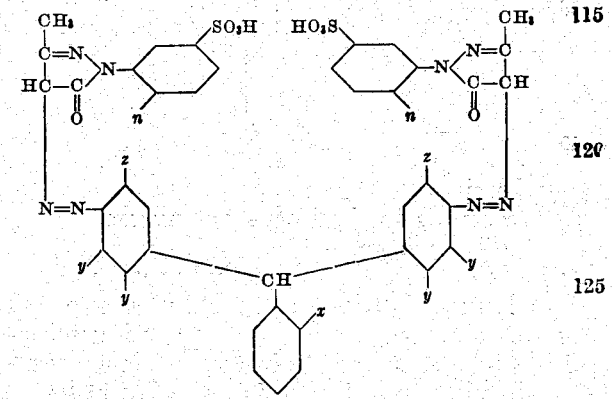

wherein $x$ stands for hydrogen or halogen, one $y$ in each nucleus for halogen, the other $y$ in each nucleus for hydrogen, $z$ for hydrogen or a methyl group and $n$ for halogen, being greenish-yellow powders which dissolve in water to a yellow solution.

5. As new products, the compounds of the following formula:

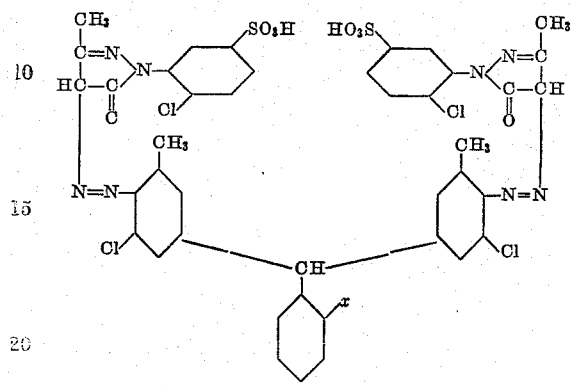

wherein $x$ stands for hydrogen or halogen, being greenish-yellow powders which dissolve in water to a yellow solution.

6. As a new product, the compound of the following formula:

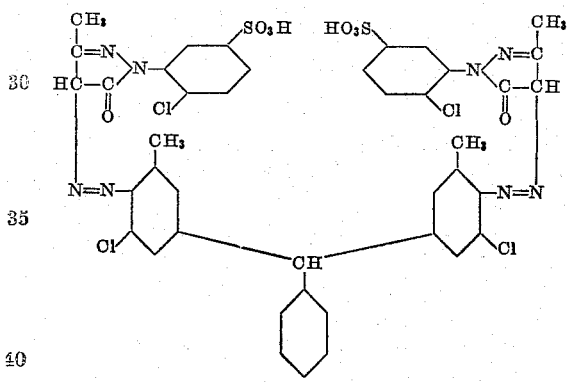

being a yellow powder which is soluble in water and which dyes wool very vivid greenish-yellow tints of very good fastness to fulling and light.

In testimony whereof, I affix my signature.
KARL THIESS.